UNITED STATES PATENT OFFICE.

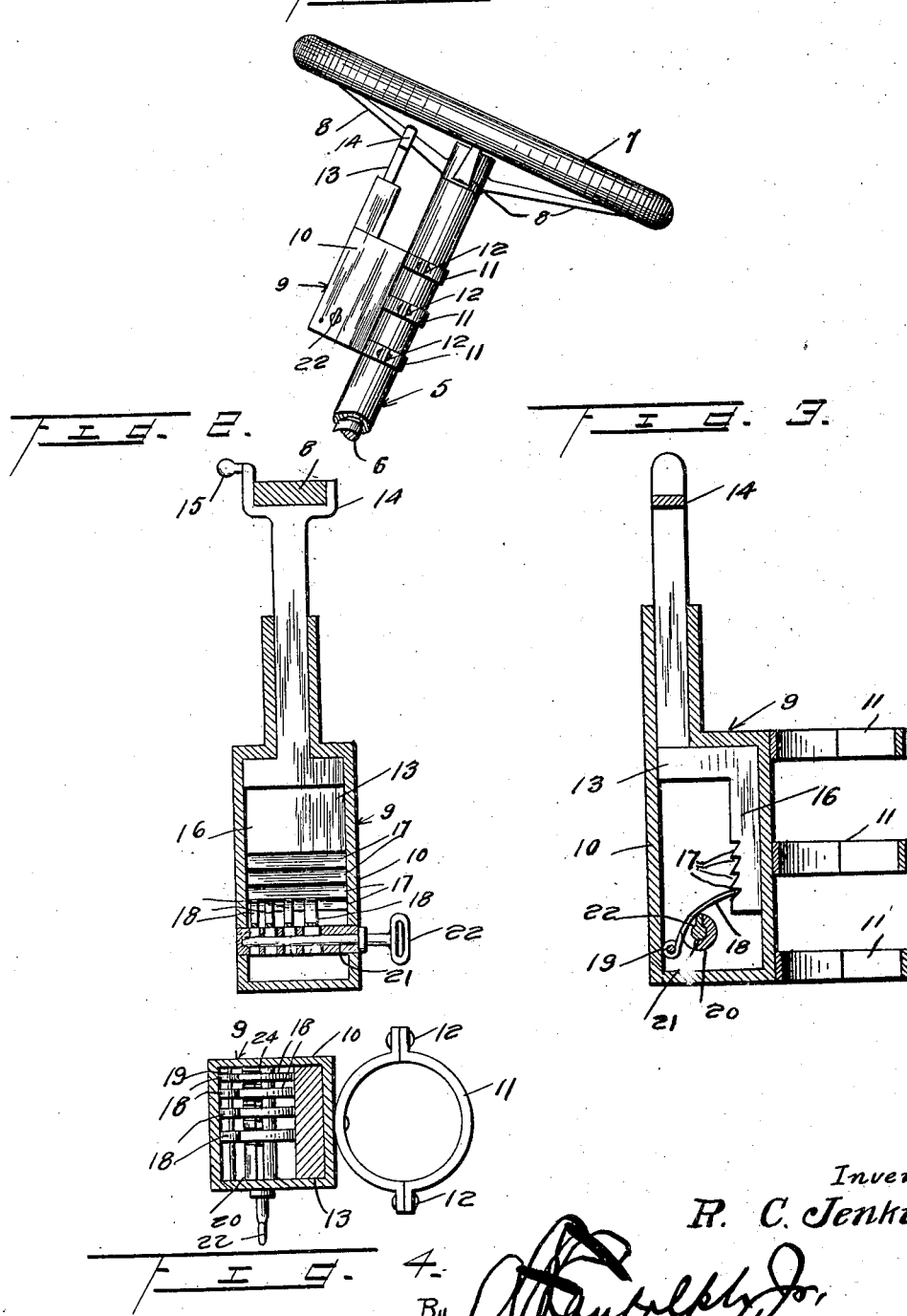

ROBERT C. JENKINS, OF BESSEMER, ALABAMA.

AUTOMOBILE-LOCK.

1,352,132.  Specification of Letters Patent.  Patented Sept. 7, 1920.

Application filed June 5, 1919. Serial No. 302,027.

*To all whom it may concern:*

Be it known that I, ROBERT C. JENKINS, a citizen of the United States, residing at Bessemer, in the county of Jefferson and State of Alabama, have invented certain new and useful Improvements in Automobile-Locks; and I do hereby declare the following to be a full, clear, and exact description of the invention, such as will enable others skilled in the art to which it appertains to make and use the same.

My invention relates to improvements in automobile locks adapted for locking the steering wheel against rotation.

An important object of this invention is to provide an automobile lock adapted to be readily engaged with a steering wheel for locking the same against rotation whereby theft of the automobile is prevented.

A further object of this invention is to provide a novel form of lock especially adapted for use in connection with the device.

A further object of the invention is to provide an automobile lock of the character described which is simple, durable in use and easy to operate.

Other objects and advantages of the invention will be apparent during the course of the following description.

In the accompanying drawing forming a part of this application and in which like numerals are employed to designate like parts throughout the same, Figure 1 is a side elevation of a steering wheel and the upper portion of the steering column provided with my improved steering wheel lock, Fig. 2 is a longitudinal section through the lock, Fig. 3 is a fragmentary longitudinal section through the lock, the view being taken at a right angle to Fig. 2, and, Fig. 4 is a horizontal section through the lock.

In the drawings wherein for the purpose of illustration is shown the preferred embodiment of my invention, the numeral 5 designates a steering column receiving a rotatable steering rod 6. A steering wheel 7 is connected to the rotatable steering rod 6 and is provided with the usual radial spokes 8.

My improved lock generally designated by the numeral 9 includes a metallic casing 10 preferably of rectangular shape. Collars 11 are secured to one side of the casing 10 and are adapted for encircling the steering column 5 for positioning the casing 10. Each collar 11 includes a pair of segmental sections connected by suitable fastening means 12. A locking bolt or member 13 is slidably mounted in the casing 10 and has its upper portion forked as indicated at 14 for straddling one of the radial spokes 8. A manipulating element 15 is provided on one of the forks of the upper end portion of the locking bolt and is adapted for raising and lowering the bolt. The lower portion of the locking bolt 13 is reduced as indicated at 16 and is provided with a plurality of transverse notches 17. A plurality of spaced flat leaf springs 18 forming latch members are riveted to the inner side of the casing as indicated at 19 and have their upper end portions free for engaging the notches 17 for retaining the locking bolt 13 elevated.

A lock barrel generally designated by the numeral 20 includes a bore 21 adapted to receive a key 22. The key 22 is provided with a plurality of bits adapted for engaging the leaf springs. As the upper end portions of the leaf springs are normally in engagement with the notches 17 the employment of the key is not necessary to retain the locking bolt in an elevated position. To release the leaf springs or latches 18, however, the key 22 is partially rotated and caused to spring the members 18 outwardly and out of engagement with the transverse notches 17.

In use the key may have any desired number of bits and the lock may be provided with a corresponding number of leaf springs to eliminate the interchangeability of keys. Immediately upon releasing the springs from engagement with the notches the locking bolt 13 returns to its normal downward position.

While I have shown the preferred embodiment of the invention, it is understood that such minor changes in arrangement and construction of parts may be made as will remain within the spirit of the invention and the scope of the appended claim.

Having thus described my invention, what I claim is:—

A lock adapted to be applied to the steering shaft tube of an automobile machine for locking the steering wheel with relation to the tube, said lock comprising a casing, means for securing the casing in position upon the tube, said casing being provided at the top side and in the vicinity of its front face with a guide sleeve, a bolt having end portions which are offset with relation to each other and which are parallel, one end portion of the bolt being slidably received in the sleeve and provided with a fork adapted to engage a spoke of the steering wheel, the other end portion of the bolt being provided with notches, a key barrel journaled in the casing and disposed transversely under the intermediate portion of the bolt and tumblers pivotally mounted in the casing and disposed transversely across the key barrel and having free ends which are engageable with the notches at the inner end of the bolt.

In testimony whereof I affix my signature in presence of two witnesses.

ROBERT C. JENKINS.

Witnesses:
RAY TILLMAN,
JOE NOSENHORST.